Oct. 11, 1949.　　A. R. NISBET, SR　　2,484,524
MEANS FOR PICKING COTTON
Filed June 17, 1947　　7 Sheets-Sheet 1

Inventor
Alexander R. Nisbet, Sr.
By
Attorney

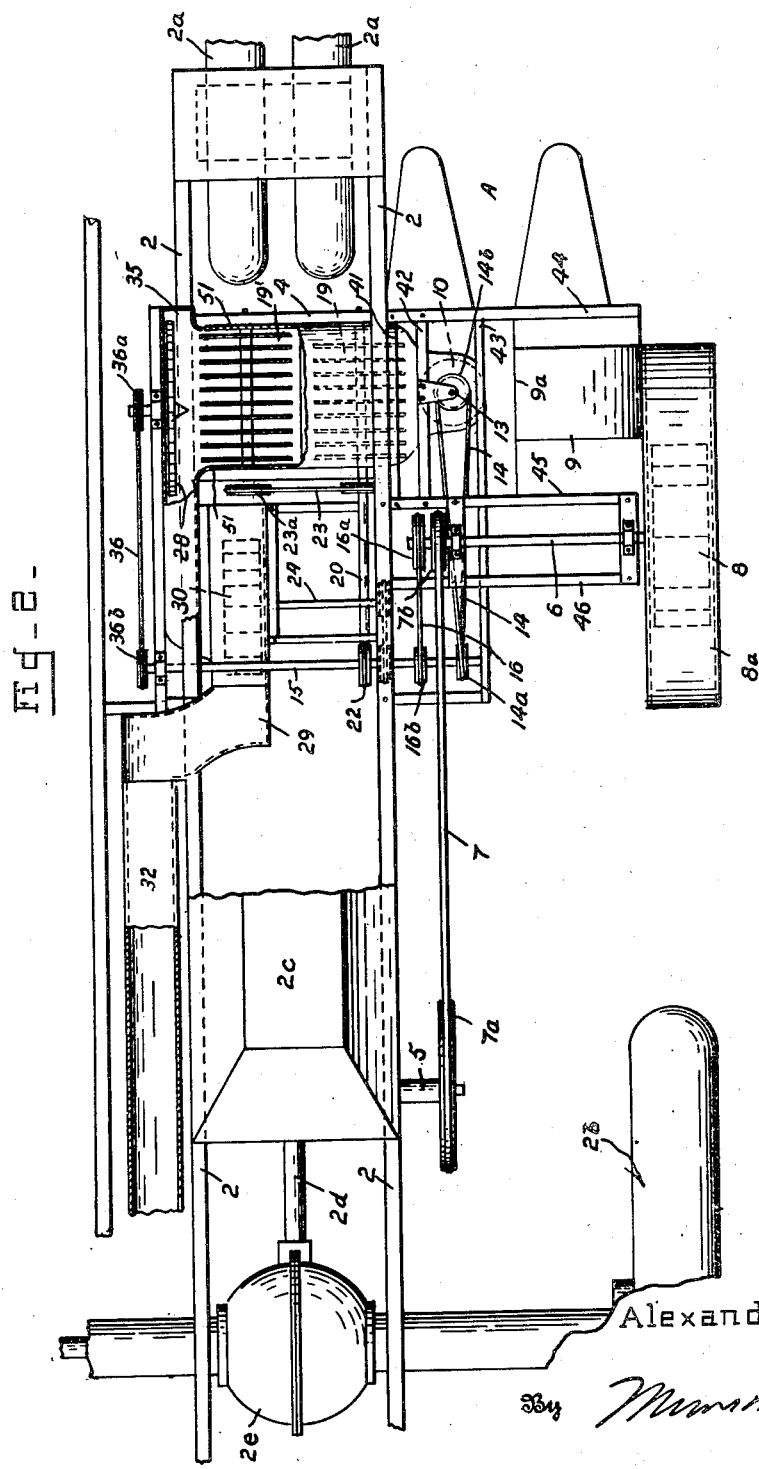

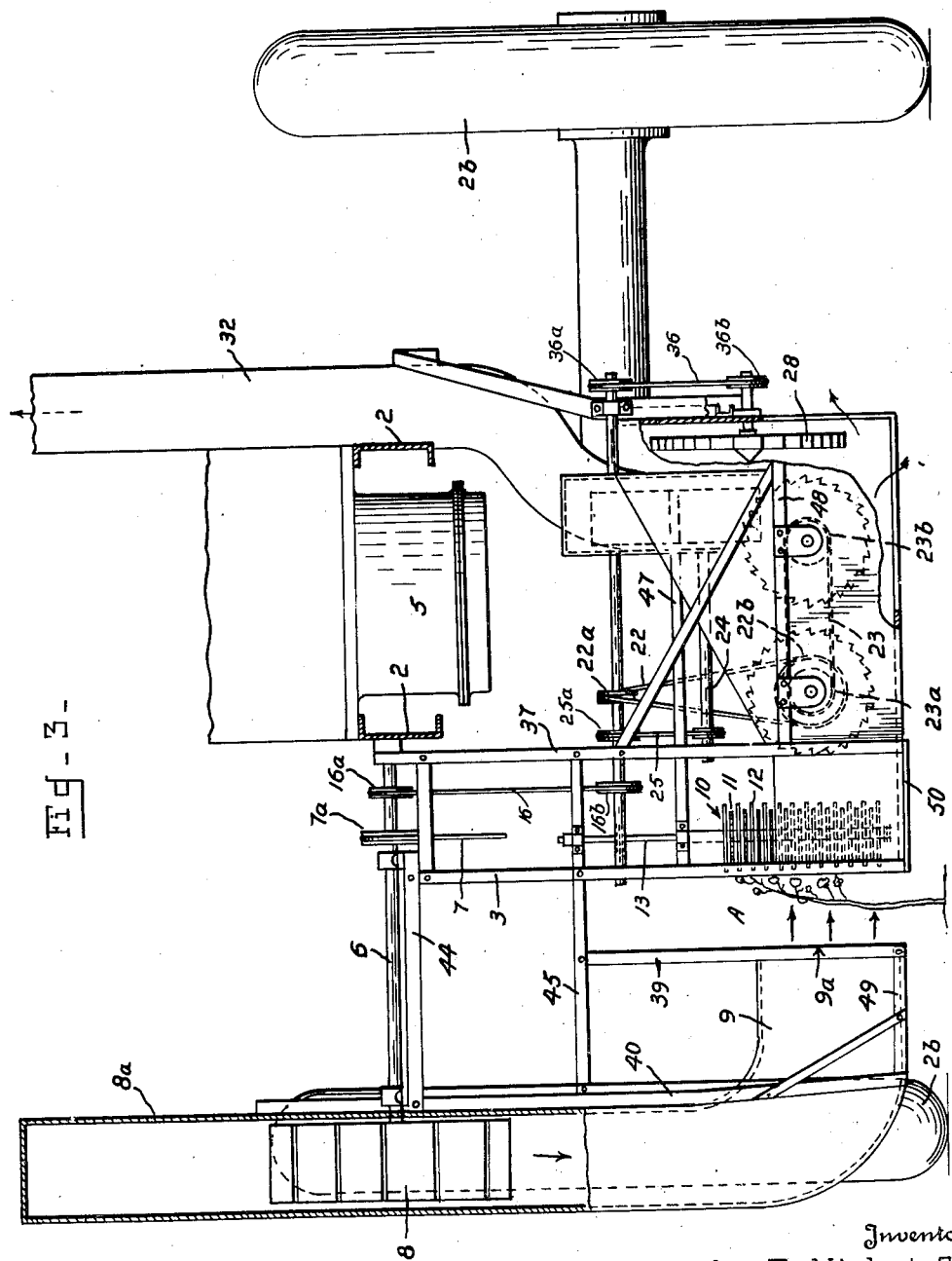

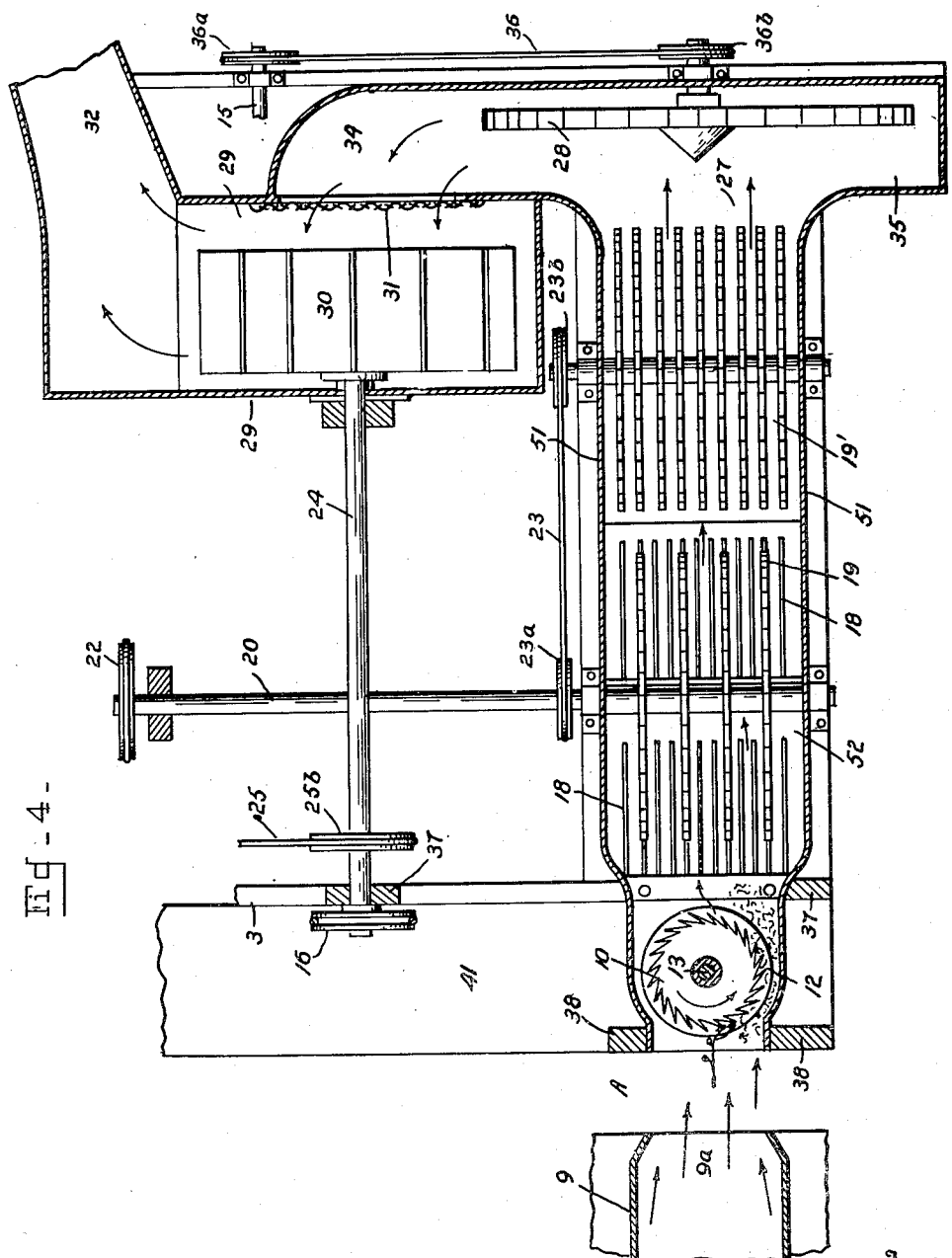

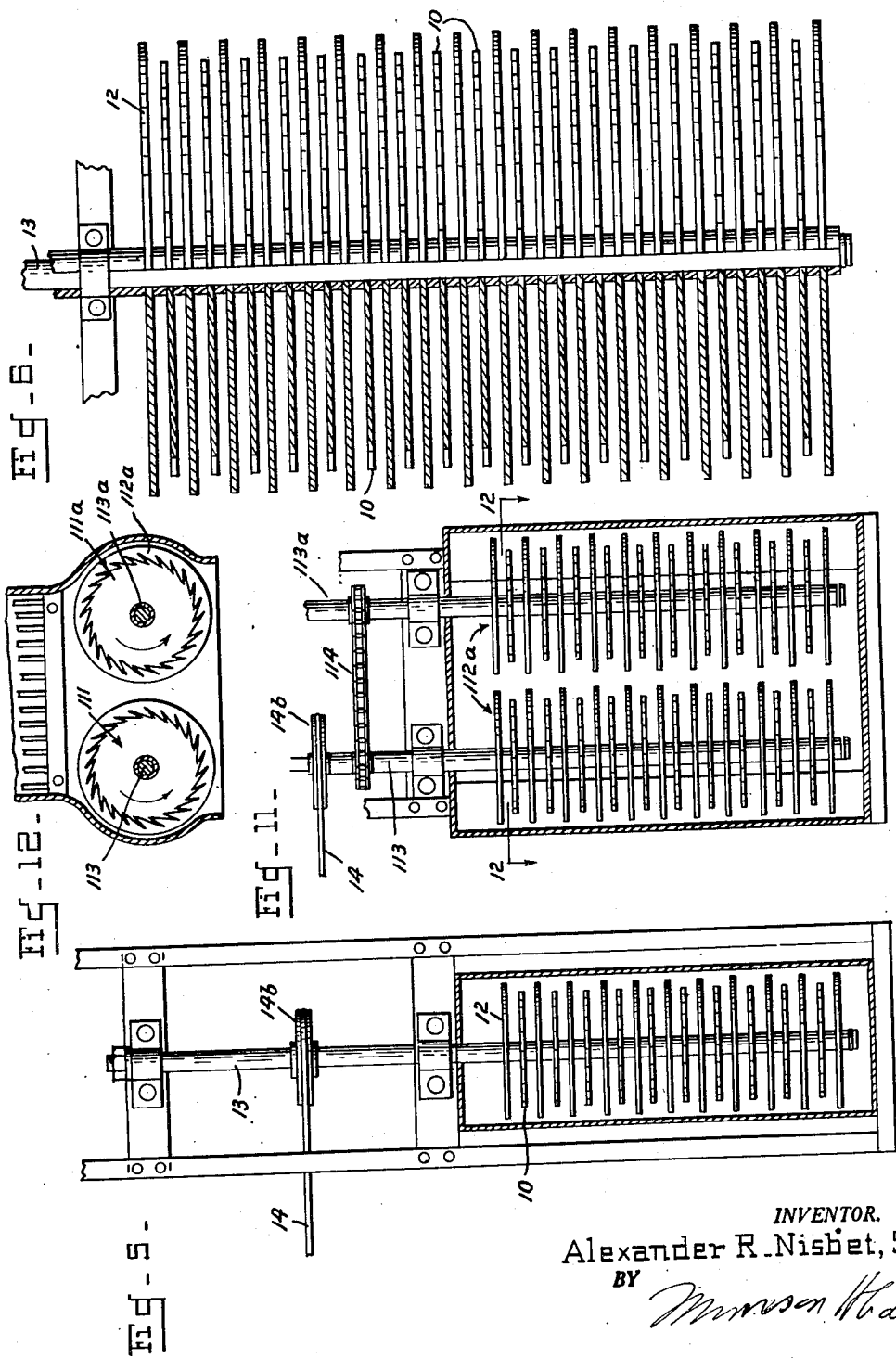

Oct. 11, 1949.  A. R. NISBET, SR  2,484,524
MEANS FOR PICKING COTTON
Filed June 17, 1947  7 Sheets-Sheet 6
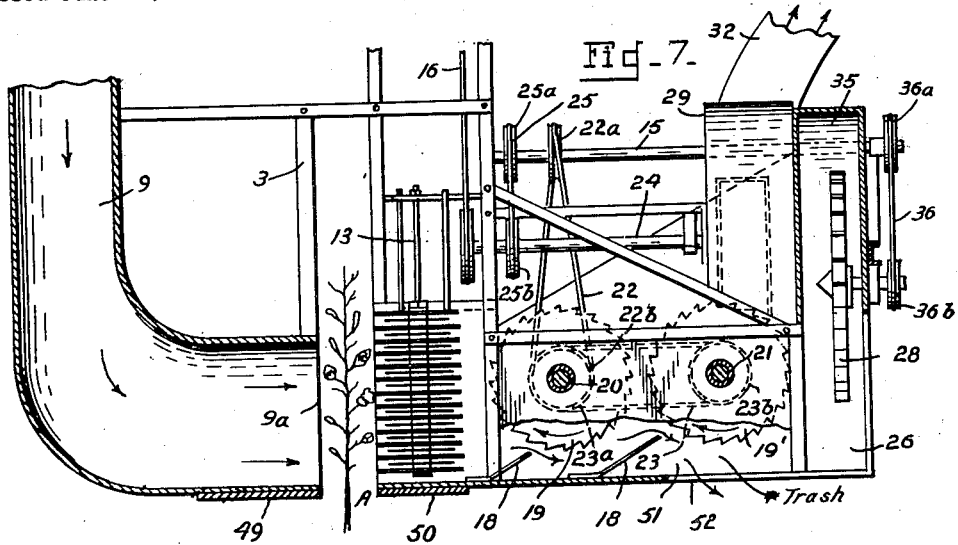
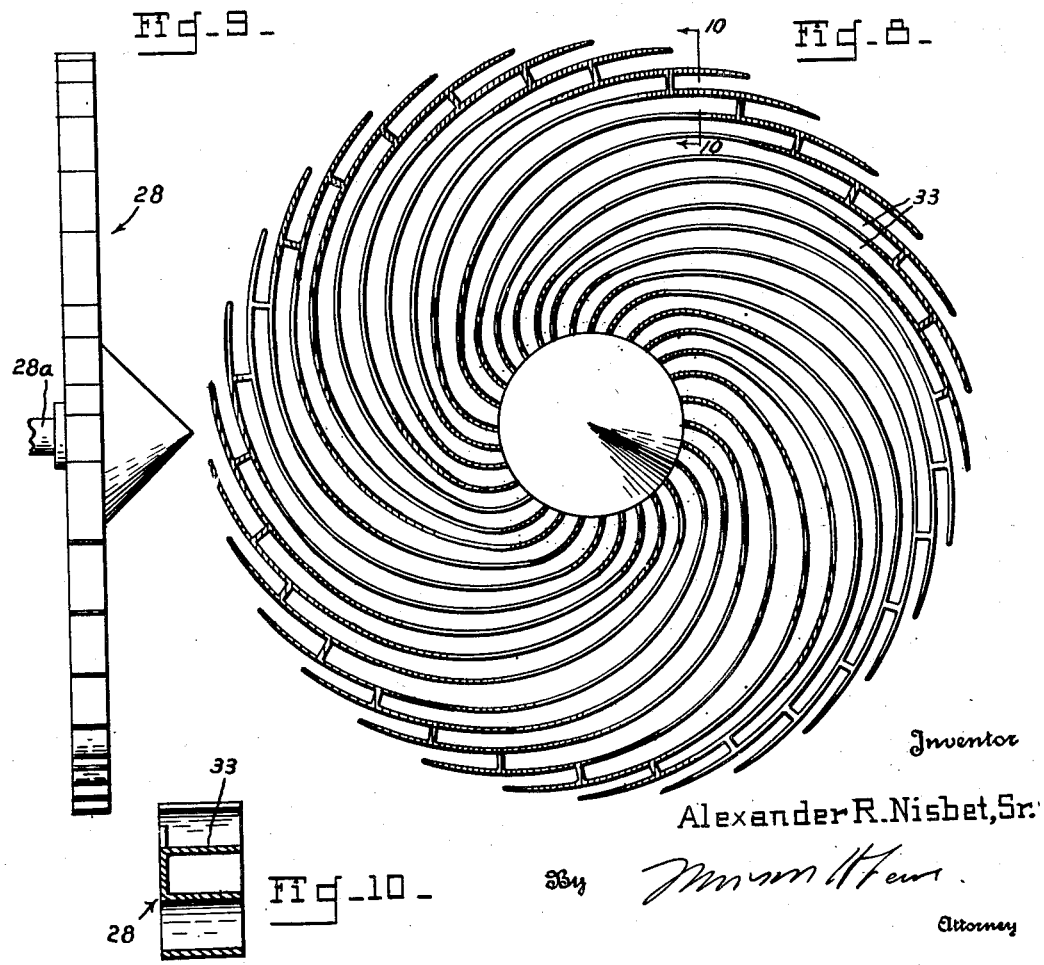
Inventor
Alexander R. Nisbet, Sr.
By
Attorney Oct. 11, 1949.  A. R. NISBET, SR  2,484,524
MEANS FOR PICKING COTTON
Filed June 17, 1947  7 Sheets-Sheet 7

INVENTOR.
Alexander R. Nisbet, Sr.
BY

Patented Oct. 11, 1949

2,484,524

UNITED STATES PATENT OFFICE 2,484,524

MEANS FOR PICKING COTTON

Alexander R. Nisbet, Sr., San Angelo, Tex.

Application June 17, 1947, Serial No. 755,181

5 Claims. (Cl. 56—12)

This invention relates to an improved means for picking cotton from the bolls on the plants without removing the bolls in which it grows, and without damage to the plants or bolls not yet open or to the fruit that is green and immature. The picker differs essentially from pickers of that type which remove the bolls from the cotton and separate the cotton from the bolls thereafter.

The present invention utilizes an air blast to blow the cotton bolls of the growing plant against one or more upright picking units each comprising a series of rotating saws suitably mounted on a central hub and spaced spart sufficiently so that the air flows freely through the unit as a whole, and after the lint has been removed from the bolls by the rotating saws and is carried with the saws for a part of their rotation (approximately 180°) the force of the same air blast which initially caused the bolls to come in contact with the saws now serves to remove the lint from the saws and to convey it to suitable cleaning, separating and transfer means whence it may be conveyed to a suitable collector or container.

It has been previously proposed to utilize the force of an air blast to blow cotton against a foraminous rotating picker and to withdraw the lint collected on the picker by means of suction. An apparatus designed for this type of picking operation is disclosed in my Patent No. 1,961,447, dated June 5, 1934, but such apparatus, while functioning with reasonable efficiency where the cotton plant is fully ripe and the bolls open, is inefficient where the cotton is at all green, as the green portions of the boll and plant soon clog the rotating screen and interfere with the air blast, and also result in a discoloration of the lint which comes in contact with the rotating screen. Moreover, I have found that the use of suction for withdrawing the lint from the foraminous screen is undesirable and is less efficient than the utilization of a single air blast to blow the bolls against spaced rotating saws and then to blow the lint from the picking saws after rotation of the saws for approximately 180° from the initial picking position.

It has also been proposed to employ suction to draw the cotton bolls against rapidly rotating picking elements and to employ suction to remove the lint from the picking units. I have found, however, that suction is less effective than an air blast either for drawing the bolls against the rotating picking unit or for removing the lint from the unit, as it is practically impossible to obtain a high degree of suction in a device of this kind. Moreover, the use of suction necessitates the employment of an airtight casing substantially enclosing the picking unit, which in itself interferes with the efficiency of the picking operation and adds to the cost of the picker, whereas according to my present improvement a free flow of air is provided from the fan or other source of air under pressure to and through the rotating picker units. To this end the picker unit should be so mounted that it is freely open to the air blast and the picking unit itself should be of such construction as to allow the air blast to pass freely therethrough. It has been found by actual test that it is impossible by means of negative pressures or suction to secure a force sufficient to bring the bolls into effective contact with the picker units, whereas by means of the positive pressure exerted by an air blast a terrific force may be applied to the bolls which brings them into intimate contact with the swiftly rotating spaced saws which constitute the picker mechanism. By having the air blast extend in a direction transverse to the plant passage and the direction of movement of the vehicle upon which the picker units are mounted the air, after forcing the bolls against the spaced saws, passes freely between the respective saws of the picker mechanism, and after passing between such saws blows the lint clinging to the teeth of the saws into a cotton transfer and delivery passage where the cotton is brought into engagement with the transfer and cleaning elements of my improved apparatus.

The picker constituting part of the present invention provides a picking element comprising one or more groups of rotating spaced toothed or saw-like picking elements against which the cotton is forced by the air blast, and the teeth of which operate to strip the cotton from the bolls in a rapid and efficient manner. The present invention further provides means comprising disks interposed between the saws, and of greater diameter than the saws, for guarding the plants against injury. The present invention still further provides simple, reliable and efficient means for collecting the cotton as picked from the rows, separating the cotton from refuse material, and delivering the cotton to a suitable receiver.

The picker is transported along a row of cotton plants for operation thereon and operated from a suitable source of power. The manner of transportation or source of power is immaterial to the invention. For convenience, however, I show it mounted on a row crop tractor by which it is carried, and the power for its operation supplied by the tractor motor.

The present application is a continuation in part of my application Serial No. 598,043, filed June 7, 1945.

In the accompanying drawings exemplificatively illustrating the invention:

Fig. 2 is a top plan view of the same;

Fig. 3 is a view in front elevation of the picker and a portion of the tractor, on an enlarged scale with respect to Figs. 1 and 2, and with parts shown in section;

Fig. 4 is a top plan view on an enlarged scale with respect to Figs. 1 and 2, partly in section, showing the essential parts of the picker;

Fig. 5 is a view partly in elevation and partly in vertical section looking from the plant passageway toward the rotary pickers and guard;

Fig. 6 is a detail view on a larger scale than the other figures, showing one of the picker units;

Fig. 7 is an enlarged vertical section through the front part of the machine;

Fig. 8 is a face view on an enlarged scale of the spiral grill wheel and collector disk;

Fig. 9 is a side elevational view of the same;

Fig. 10 is a detail section on the line 10—10 of Fig. 8;

Fig. 11 is a view similar to Fig. 5 but with parts broken away and showing a modification in which the picker comprises more than one set of saws;

Fig. 12 is a section on line 12—12 of Fig. 11;

Fig. 15 is a cross section through a picker unit shaft.

Figure 1:
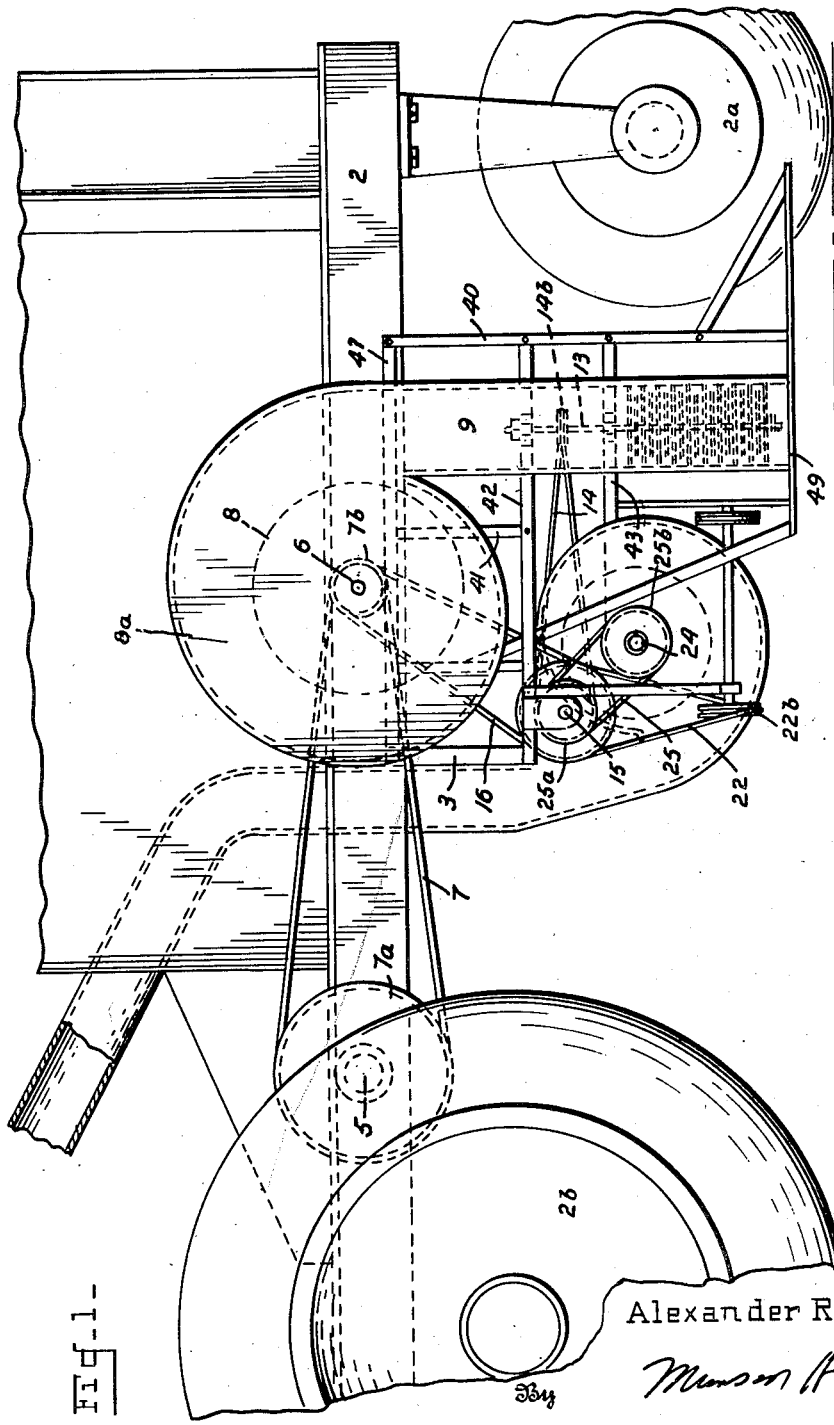
Fig. 1 is a side elevational view of parts of the picker attached to a tractor, a portion of the tractor being shown.

It will be noted that Figs. 4, 5, 6, 8, 9, 10, 11, 12, 13 and 14 are on an enlarged scale with respect to Figs. 1, 2 and 7.

The picker is shown applied to a tractor 1 which is shown only in outline and needs only a brief explanation. The numeral 2 represents longitudinal bars constituting portions of the frame of the tractor; 3 portion of the frame of the picker; and 4 casing parts which support and enclose portions of the picker. In the present construction, however, the casing 4 is more in the nature of a supporting frame for the various parts of the picker than an enclosing housing, and it may be, and preferably is, open through a substantial portion of its bottom and front end to allow the air blast to flow freely therethrough and to permit trash and foreign material to pass from the picker, and in this respect the casing 4 differs from the fluidtight conduits required where suction as distinguished from an air blast is relied upon to bring the bolls into contact with the picking unit, to remove the lint therefrom, and to transfer the picked cotton to a container or receptacle.

The tractor may be one of a well known type having front supporting and steering wheels 2ª, rear supporting and driving wheels 2ᵇ, a suitable body 2ᶜ in which an internal combustion or other suitable motor may be enclosed, a propeller shaft 2ᵈ driven by the motor, and a differential gearing 2ᵉ through which the rear wheels are driven from the propeller shaft. 5 is a power take-off shaft suitably driven from the tractor motor, and 6 is a countershaft suitably driven therefrom, as by a belt 7 passing about pulleys 7ª and 7ᵇ, from which countershaft the operating parts of the picker are driven.

A blast fan 8 is mounted on and driven by the shaft 6 and the casing 8ª of this fan has a discharge duct or conduit 9 whose outlet end or nozzle 9ª faces toward and is arranged in spaced relation to a rotary picker device 10 for cooperation therewith as hereinafter described. In the travel of the machine along a cotton row the parts 9 and 10 are disposed on opposite sides of a plant passageway A and the blast from the fan strikes each plant and forces the same against the picker device. This device may comprise one or more sets of spaced rotary gathering or picking saws 11, mounted with guard disks 12 on a vertical shaft 13, the saws being uniformly spaced from each other by the disks 12. Any number of sets of saws and disks may be used, one being shown in the embodiment set forth in Figs. 1-7, and two being shown in the embodiments set forth in Figs. 11-14, inclusive. The disks and saws of the sets used may be of any suitable size. The teeth of these saws engage and remove the cotton from the open bolls without injury to the plants or bolls not yet open, or to the fruit that is green and immature. The guard disks 12 are of slightly larger diameter than the saws and project peripherally beyond the teeth of the saws sufficiently to prevent the stalk of the plant from coming in contact with the saws. A belt 14, passing about pulleys 14ª and 14ᵇ, drives the picker shaft 13 from a transmission shaft 15, which is driven by a belt 16, passing about pulleys 16ª and 16ᵇ, from the shaft 6. Instead of belts it will, of course, be understood that any other suitable type of gearing may be employed to operate the shafts. The space or passageway A between the outlet of the fan duct 9 and the set of saws 11 is of a proper width to receive the plants of a row as the machine travels therealong.

In the embodiment of the invention illustrated in Figs. 11 and 12 two sets of picking saws 111 and 111ª may be substituted for the single set of spaced saws disclosed in the previously described embodiment of the invention. These picking units are so mounted as to coact with the air blast from the fan discharge 9 in the manner previously described and as particularly illustrated in Fig. 4 in connection with the single unit. The saw units of each set may be equipped with guard disks 112 and 112ª similar in arrangement and function to the guard disks 12 of the previously described embodiment, being of slightly greater diameter than the saws themselves. Shafts 113, 113ª carry the saws and, as shown, are interconnected by a sprocket chain 114 so that both shafts may be driven in unison from a common source of power.

Figure 14:
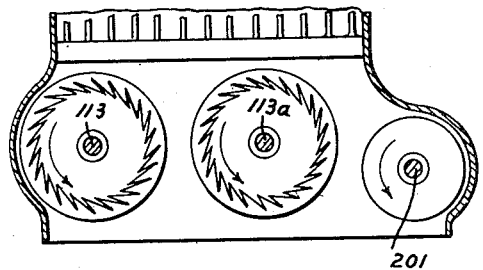
Fig. 14 is a section on line 14—14 of Fig. 13.
Figure 13:
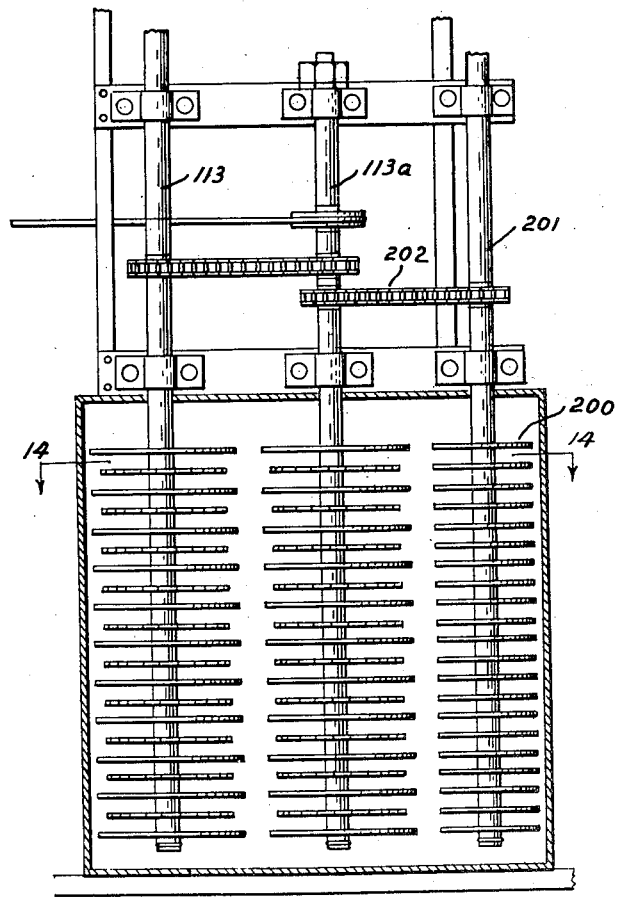
Fig. 13 is a view similar to Fig. 5 but showing a further modification in which a rotary guard unit is employed in connection with a plurality of rotating picker units.

In the embodiment shown in Figs. 13 and 14 two sets of saw units are shown similar to those disclosed in Figs. 11 and 12, and the picker unit also includes a rotary guard unit consisting of spaced smooth guard disks 200 secured to a shaft 201, which shaft is connected by a sprocket chain 202 to the shaft 113ª on which one of the saw units is mounted. It will be apparent, however, that any desired number of picker units may be employed, either with or without the rotary guard units 200.

In operation the growing cotton in the plant passageway A is blown against the saws of the picker unit by the blast from the fan duct 9 and the lint is torn from the bolls by the teeth of the rapidly rotating saws of the picker unit. The cotton picked by the saws is carried thereby in the direction of the arrow as indicated in Fig. 4, and when the saws have rotated about 180° from the initial picking position the same blast which initially forced the bolls against the picking unit serves to remove the lint from the saw teeth, this being possible owing to the spacing of the saws and guard disks on the central hub of the picker unit, whereby free flow of air through the unit is insured. A similar operation takes place where more than one picker unit is employed, either with or without a supplemental guard unit.

In each instance the cotton fiber or lint, after having been removed from the bolls by the rotating saws and carried about 180° from its initial picking position, is blown from the saws onto a deflector screen arranged in the base of the casing 4 and formed of one or more rows or sets of upwardly inclined rods 18, the rows of rods and the rods of each set being suitably spaced from each other. The cotton, which is lighter than the trash and foreign material, is blown from the saws over these rods by the blast from the fan and is then directed toward sets of rotary saws or toothed transfer disks 19, 19' mounted on horizontal shafts 20, 21, which throw the cotton fiber against a rotary feed disk 28, the heavier particles of trash or foreign material dropping through the open bottom or being blown through the open end of the machine and thence falling to the ground.

The sets of saw disks 19 and 19' are or may be of the same general construction except that the disks 19 are preferably somewhat heavier or thicker than the disks 19' and are less in number than the disks 19' and spaced a greater distance apart. In the present instance the disks 19 mounted on shaft 20 are four in number, while nine disks 19' are shown mounted on shaft 21 and arranged close together to pick up both small and large particles of cotton, including those particles picked up and blown from the disks 19 and those blown through the spaces between the disks 19. Shaft 20 is driven by a belt 22, passing about pulleys 22ª and 22ᵇ, from shaft 15, and shaft 21 is driven from shaft 20 by a belt 23, passing about pulleys 23ª and 23ᵇ.

A shaft 24, arranged parallel with shaft 15, is driven from the latter by a belt 25 passing about pulleys 25ª, 25ᵇ on said shafts.

The disks of the rear set of disks 19' project partially into a casing 26 through the open front 27 thereof and discharge the cotton through an opening 27 at the rear of said casing against the rotary feed disk 28. This disk is mounted on a shaft 28ª set eccentrically to the opening 27 so that the discharge portion of the periphery of the disk 28 projects laterally beyond one side of the casing and into the mouth of a casing or chamber 29 in which is arranged a suction and discharge fan 30, mounted on shaft 24, and a screen 31, and with which communicates a discharge duct or elevator 32.

The inner face of the disk 28 is provided with spirally shaped grooves 33 which open at their discharge ends through the periphery of the disk. These grooves in the rotation of the disk collect the cotton forced rearwardly by the disks 19 and drawn toward it by the suction of the fan 30 and discharge the cotton by centrifugal force through an inlet passage 34 into the casing 29. A hood 35 formed by a part of the casing 26 encloses the disk 28 except at its front and discharge side, which opens into the passage 34, so as to confine the collected cotton until it is discharged into the passage 34. The cotton fed through this passage by the rotation of the disk 28 and suction of the fan 30 is relieved by the disk 28 of a portion of the finer refuse material feeding therewith and the greater portion of the remainder of the finer foreign material is removed by the screen 31. This cotton, which is now in a very fairly clean condition, free from dirt and trash, is discharged by the fan 30 through the duct or elevator 32 to a suitable receiver. A belt 36 passing about pulleys 36ª, 36ᵇ drives the disk 28 from the transmission shaft 15.

The supporting frame portion 3 of the picker structure is arranged at one side of the main frame of the tractor and includes sets of vertical bars 37, 38, 39 and 40, upper and lower horizontal, longitudinal bars 41, 42, 43, and horizontal transverse bars 44, 45, 46, 47 and 48, suitably connected and braced by other bars and braces. The shaft 6 extends outwardly at the same side of the bars and is journaled therein and in the adjacent frame bar 2, from which and the shaft the frame portion is suspended at said side of the tractor. The lower portions of the bars 39 and 40 cooperate with a base 49 to support the fan casing 8ª, while bars 37, 38 cooperate with a base 50 to support the picker 10. These fan casing and picker supporting parts are spaced to form the plant passage A. The frame or casing part 4 includes the bars 37, 48 and an open-topped trough or casing section, formed by side walls 51 and a bottom 52, and this frame or casing part 4 is secured to the bars 37, 38 and 45 and carries the casing 29 and 35. Frame part 4 extends under the tractor frame between the body and front wheels to the opposite side of the frame from that at which the fan 8 and picker 10 are located and is suitably suspended by the elevator 32 from the frame bar opposite the first named frame bar 2 beyond which frame part 3 projects. The frame part 4 supports the shafts 15, 20, 21, 24, 28ª and the elements of the cotton conveying means which feed the cotton picked by the picker 10 to the elevator 32. The foregoing describes a frame which is suitable for the purpose, but which may be varied in construction from that disclosed, and it will be seen that this frame supports the parts in such manner that the cotton is picked by the picker 10 at one side of the frame and discharged by the elevator at the opposite sides of the frame.

The improved picking method has been described in connection with the specific cleaning, separating, conveying and transfer mechanism set forth in my prior application Serial No. 598,043 for the purpose of illustration, but it will be apparent that other means may be employed for performing these operations after the cotton has been removed from the bolls by the rotating saws and has been blown from said saws by the same air blast which initially forced the bolls of the growing plants against the rotating picker saws.

From the foregoing description, taken in connection with the drawings, the construction and mode of operation of my improved cotton picking machine will be readily understood without a further and extended description. This machine has been found in practice to operate quickly and in an efficient manner to remove cotton from the bolls without removing the bolls and without injury to unopened bolls or other portions of the plants. While it is preferred to employ the transfer elements 18 and 19 they may under some conditions be omitted or other transfer means substituted. Other feeding means through disk 28 may also be employed. It is contemplated that other changes in the form, construction and arrangement of the parts, falling within the scope of the appended claims, may be made without departing from the spirit or sacrificing any of the advantages of the invention.

I claim:

1. A cotton picker including a portable frame having a plant passage and having a cotton transfer passage extending transversely of the plant passage and having an inlet at one side of the plant passage, a rotary toothed picker comprising vertically spaced rotary saws located at said inlet and blower means at the opposite side of said plant passage, and having its outlet arranged to direct an air blast transversely to said plant passage, for blowing bolls of cotton against said spaced saws whereby the lint is removed from the bolls and conveyed by means of the air blast into and through the transfer passage on the opposite side of said plant passage.

2. A cotton picker including a portable frame having a plant passage and having a cotton transfer passage extending transversely of the plant passage and having an inlet at one side of the plant passage, a rotary toothed picker comprising vertically spaced rotary saws located at said inlet and blower means at the opposite side of said plant passage, and having its outlet arranged to direct an air blast transversely to said saws whereby the lint is removed from the bolls and conveyed by means of the air blast into and through the transfer passage on the opposite side of said plant passage, and cotton cleaning means located within said transfer passage beyond the rotary picker.

3. A cotton picker including a portable frame having a plant passage extending therethrough in the direction of movement of the vehicle, and having a cotton transfer passage extending transversely of the plant passage and having an inlet communicating with said plant passage, picker means located at the inlet of said transfer passage and comprising a plurality of picker units each including a plurality of vertically spaced saws having portions thereof facing said plant passage, and blower means on the opposite side of said plant passage from the picker means, and having an air blast outlet facing said picker and the inlet to said transfer passage, whereby bolls of cotton plants in said plant passage are forced against said saws and the lint removed by said saws and forced by the air blast into and through said transfer passage.

4. A cotton picker including a portable frame having a plant passage extending therethrough in the direction of movement of the vehicle, and having a cotton transfer passage extending transversely of the plant passage and having an inlet communicating with said plant passage, picker means located at the inlet of said transfer passage and comprising a plurality of units each including a plurality of vertically spaced saws having portions thereof facing said plant passage, and blower means on the opposite side of said plant passage from the picker means, and having an air blast outlet facing said picker and the inlet to said transfer passage, whereby bolls of cotton plants in said plant passage are forced against said saws and the lint removed by said saws and forced by the air blast into and through said transfer passage, and cotton cleaning means in said transfer passage beyond said picker means.

5. A portable cotton picking unit as set forth in claim 1, wherein a guard unit is mounted in the inlet to the transfer passage adjacent the picker.

ALEXANDER R. NISBET, Sr.

REFERENCES CITED

The following references are of record in the file of this patent:

UNITED STATES PATENTS

| Number | Name | Date |
| --- | --- | --- |
| 555,691 | Gaskill | Mar. 3, 1896 |
| 1,717,409 | Riza | June 18, 1929 |
| 1,845,431 | Martin | Feb. 16, 1932 |
| 1,961,447 | Nisbet | June 5, 1934 |
| 2,208,570 | Box | July 23, 1940 |
| 2,427,155 | Nisbet, Sr. | Sept. 9, 1947 |